United States Patent
Hindman et al.

(10) Patent No.: US 8,816,260 B2
(45) Date of Patent: Aug. 26, 2014

(54) FLIGHT-CONTROL SYSTEM FOR CANARD-CONTROLLED FLIGHT VEHICLES AND METHODS FOR ADAPTIVELY LIMITING ACCELERATION

(75) Inventors: Richard E. Hindman, Tucson, AZ (US); Kyle David Andringa, Sahuarita, AZ (US); Darrell B. Ridgely, Oro Valley, AZ (US)

(73) Assignee: Raytheon Company, Waltham, MA (US)

( * ) Notice: Subject to any disclaimer, the term of this patent is extended or adjusted under 35 U.S.C. 154(b) by 396 days.

(21) Appl. No.: 12/957,557

(22) Filed: Dec. 1, 2010

(65) Prior Publication Data

US 2012/0138729 A1 Jun. 7, 2012

(51) Int. Cl.
*F41G 7/00* (2006.01)
*F42B 10/00* (2006.01)
*F42B 15/01* (2006.01)

(52) U.S. Cl.
USPC .......... 244/3.2; 244/3.21; 244/3.24; 244/178; 701/3

(58) Field of Classification Search
USPC .............. 244/45 A, 194, 195, 3.1, 3.15, 3.21, 244/75.1, 3.24; 701/3, 7
See application file for complete search history.

(56) References Cited

U.S. PATENT DOCUMENTS

| | | | |
|---|---|---|---|
| 3,051,416 A | | 8/1962 | Rotier |
| 3,857,535 A | | 12/1974 | Osder |
| 4,054,254 A | * | 10/1977 | Cole ............................ 244/3.21 |
| 5,722,614 A | * | 3/1998 | Wicke .......................... 244/3.15 |
| 6,189,836 B1 | * | 2/2001 | Gold et al. .................... 244/191 |
| 6,325,333 B1 | | 12/2001 | Najmabadi et al. |
| 6,332,105 B1 | * | 12/2001 | Calise et al. ....................... 701/3 |
| 6,539,290 B1 | | 3/2003 | Vos |
| 6,848,648 B2 | * | 2/2005 | Klestadt et al. .............. 244/3.23 |
| 7,834,300 B2 | * | 11/2010 | Zemany et al. .............. 244/3.15 |
| 8,058,596 B2 | * | 11/2011 | Kinsey et al. ................. 244/3.22 |
| 8,242,423 B2 | * | 8/2012 | Geswender et al. ........... 244/3.2 |

FOREIGN PATENT DOCUMENTS

WO  WO-2012074600 A1  6/2012

OTHER PUBLICATIONS

"International Application Serial No. PCT/US2011/054232, International Search Report mailed Mar. 5, 2012", 2 pgs.
"International Application Serial No. PCT/US2011/054232, Written Opinion mailed Mar. 5, 2012", 5 pgs.
Härkegård, Ola, "Flight Control Design Using Backstepping, Thesis", *Linköping Studies in Science and Technology, Thesis No. 875*, [online]. Retrieved from the Internet: <http://www.control.isy.se/research/reports/ LicentiateThesis/Lic875.pdf>, (2001), 126 pgs.

(Continued)

*Primary Examiner* — Rob Swiatek
*Assistant Examiner* — George Andonyan
(74) *Attorney, Agent, or Firm* — Schwegman Lundberg & Woessner, P.A.

(57) ABSTRACT

Embodiments of a flight-control system and methods of reducing the probability of a roll-control reversal in a canard-controlled flight vehicle are generally described herein. In some embodiments, the flight-control system may monitor angular velocities of the flight vehicle to detect the onset of instability and adaptively control an acceleration limit of the flight vehicle based on the detected instability to reduce the probability of a roll-control reversal. The onset of instability may be detected by persistently high angular velocities. The acceleration limit may be further adaptively controlled based on an approach of a vehicle trim limit.

12 Claims, 6 Drawing Sheets

FLIGHT-CONTROL SYSTEM

(56) References Cited

OTHER PUBLICATIONS

Rogers, Jonathan, et al., "Design of a Roll-Stabilized Mortar Projectile with Reciprocating Canards", *Journal of Guidance, Control, and Dynamics vol. 33 No. 4*, [Online]. Retrieved from the Internet:<http://mcostello.ae.gatech.edu/files/AIAA-47820-764.pdf>, (2010), 1026-1034.

\* cited by examiner

FIG. 1A FLIGHT VEHICLE

FIG. 1B

FIG. 2A FLIGHT-CONTROL SYSTEM

FLIGHT-CONTROL SYSTEM FOR CANARD-CONTROLLED FLIGHT VEHICLES AND METHODS FOR ADAPTIVELY LIMITING ACCELERATION

TECHNICAL FIELD

Embodiments pertain to flight vehicles, including munitions, missiles, ballistic missiles and unmanned aerial vehicles (UAVs). Some embodiments relate to canard-controlled flight vehicles with fixed tail fins. Some embodiments relate to preventing roll-control reversal in flight vehicles.

BACKGROUND

Many flight vehicles use controllable flight surfaces, such as canards or tails, to achieve guidance acceleration commands as well as to control various aspects of the vehicle's flight including roll angle. At higher angles-of-attack, some canard-controlled flight vehicles may experience control instability, such as a roll-control reversal. A roll-control reversal occurs when the airflow over the canards interacts with the tail fins to cause the flight-vehicle to roll in a direction opposite that achieved at lower angles-of-attack.

Static acceleration limits have been conventionally used to help ensure flight-vehicle stability by statically limiting the angle-of-attack of a flight vehicle. One problem with these static acceleration limits is that these limits are conservative to account for the uncertainty of the angle-of-attack at which roll-control reversals occur. As a result, the acceleration capability of a flight vehicle is reduced, resulting in lower performance levels (e.g., lower maneuverability and range).

Thus, what are needed are improved flight-control systems that prevent instability, such as roll-control reversal, in flight vehicles. What are also needed are flight-control systems that avoid roll-control reversals but do not overly restrict the acceleration capability of the flight vehicle. What are also needed are flight-control systems that help avoid roll-control reversal by adapting in real-time to measures of flight performance to allow higher acceleration limits.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
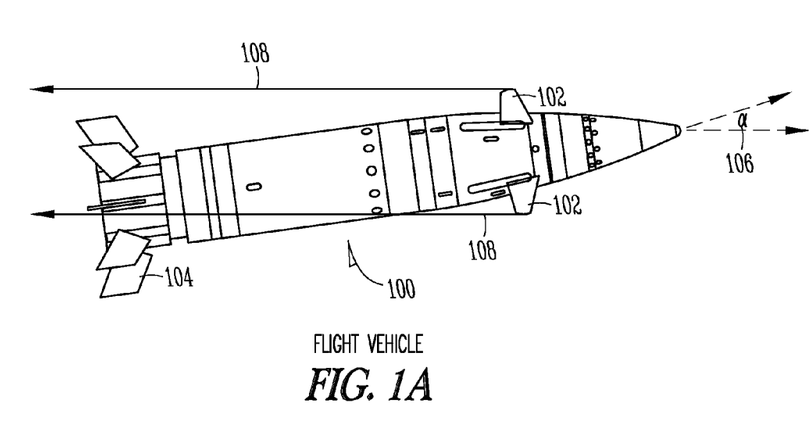
FIGS. 1A and 1B illustrate a flight vehicle in accordance with some embodiments.
Figure 1B:
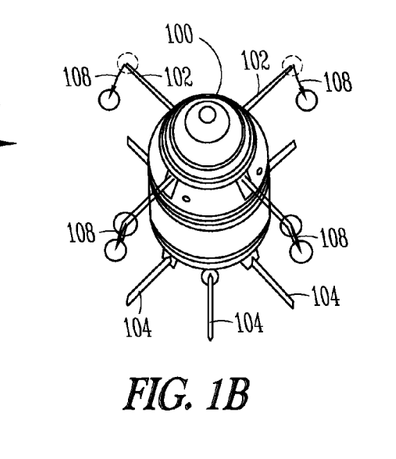

FIGS. 1A and 1B illustrate a flight vehicle 100 in accordance with some embodiments. Flight vehicle 100 is a canard controlled flight vehicle with fixed tail fins 104 and controllable canards 102. FIG. 1A illustrates a side-view of flight-vehicle 100, and FIG. 1B illustrates a frontal view of flight-vehicle 100.

The canards 102 may be used to control the flight of the flight vehicle 100. The canards 102 may also be used to control the roll of the flight vehicle 100. At higher positive angles-of-attack ($\alpha$) 106, unbalanced vortices 108 off the bottom canards 102 may interact with the fixed tail fins 104 to produce a roll effect that is opposite of the roll effect that occurs at lower positive angles-of-attack 106. This may result in a roll-control reversal.

In accordance with embodiments, the flight vehicle 100 may be configured to monitor its angular velocities to detect the onset of instability and may adaptively control an acceleration limit based on the detected instability. The adaptively-controlled acceleration limit may reduce the probability of a roll-control reversal and possibly avoid a roll-control reversal. In these embodiments, the onset of instability may be detected by persistently high angular velocities. In some embodiments, the acceleration limit may be further adaptively controlled based on an approach of a vehicle trim limit. These embodiments are discussed in more detail below.

By adaptively limiting the acceleration of the flight vehicle 100 based on real-time monitoring of the angular velocities and, in some embodiments, the approach of a vehicle trim limit, the positive angles-of-attack 106 of the flight vehicle 100 may be reduced, thereby avoiding a roll-control reversal. The use of an adaptive acceleration limit may allow higher vehicular accelerations to be achieved over conventional static acceleration limits. These higher allowed vehicular accelerations may provide increased maneuverability and range of the flight vehicle 100.

Unlike in prior attempts to prevent roll-control reversal, control surface deflection may be monitored to actively limit commands. In accordance with these embodiments, control surface deflection may be determined by actively monitoring the commanded canard positions based on the canard-control signals to determine when the flight vehicle 100 is nearing a vehicle trim limit so that the flight vehicle 100 can remain within trimmable accelerations. These embodiments are described in more detail below.

The flight vehicle 100 may be a gun-launched canard-controlled munition having controllable canards 102 and fixed tail fins 104. In some of these embodiments, the flight vehicle 100 may include four canards 102 and eight fixed tail fins 104, although the scope of the embodiments is not limited in this respect. The four canards 102 may be positioned in an 'X' or '+' configuration during flight. Although several of the embodiments disclosed herein are applicable to canard-controlled flight vehicles with fixed tail fins, the scope of the invention is not limited in this respect as other embodiments are applicable to tail-controlled flight vehicles.

The flight vehicle 100 may also be a self-propelled guided missile having controllable canards 102 and fixed tail fins 104. In these embodiments, the guided missile may, for example, be a cruise missile or ballistic missile. The flight vehicle 100 may also be an unmanned aerial vehicle (UAV).

Figure 2A:
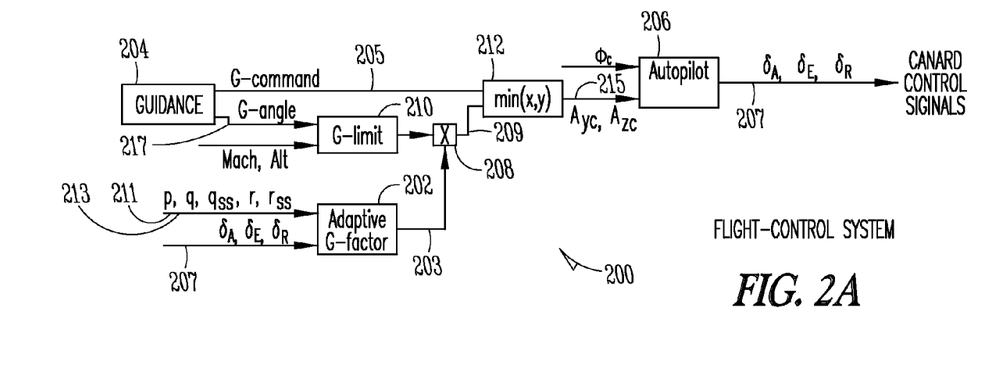
FIG. 2A is a functional block diagram of a flight-control system in accordance with some embodiments.

FIG. 2A is a functional block diagram of a flight-control system in accordance with some embodiments. The flight-control system 200 may be suitable for use as a flight-control system of the flight vehicle 100 (FIG. 1A), although other flight-control systems may also be suitable. Flight-control system 200 may include, among other things, an adaptive G-factor compensation block 202, a guidance block 204, an autopilot 206, multiplication element 208, G-limit block 210, and minimum selection element 212. In accordance with embodiments, the adaptive G-factor compensation block 202 may be configured to monitor angular velocities 211 of the flight vehicle 100 to detect the onset of instability. The adaptive G-factor compensation block 202 may also be configured to adaptively dynamically control an acceleration limit of the flight vehicle 100 based on the detected instability to reduce the probability of a roll-control reversal.

The onset of instability may be detected by persistently high angular velocities 211, and the acceleration limit may be further adaptively controlled based on an approach of a vehicle trim limit, which may be determined at least in part from canard-control signals 207. It should be noted that approaching the trim limit of flight vehicle 100 does not necessarily indicate an onset of instability. In some embodiments discussed in more detail below, the onset of instability may be indicated by a rate penalty, and the approach of the vehicle trim limit may be indicated by a maximum fin penalty. By adaptively limiting the acceleration of the flight vehicle 100 based on real-time monitoring of the angular velocities 211 and the commanded canard positions from canard-control signals 207, the angle-of-attack 106 (FIG. 1A) of the flight vehicle 100 may be reduced to avoid a roll-control reversal.

In accordance with some embodiments, the autopilot 206 may be configured to generate the canard-control signals 207 at least in part based on an adaptively-controlled acceleration limit 209. The adaptive G-factor compensation block 202 may be configured to monitor the commanded canard positions based on the canard-control signals 207 to determine when the flight vehicle 100 is nearing the vehicle trim limit. The adaptive G-factor compensation block 202 may generate an adaptive G-factor 203 as its output, which may be configured to reduce the acceleration limit of G-limit block 210 when the flight vehicle 100 is nearing the vehicle trim limit.

In these embodiments, when the canards 102 (FIG. 1A) are being commanded to turn to within a predetermined number of degrees within their limit (e.g., within a fin limit), the flight vehicle 100 may be approaching its control limit, which may indicate that the airframe capability is near its trim limit. Accordingly, the static acceleration limit of the flight vehicle 100 provided by G-limit block 210 may be further adaptively limited so as to not exceed the trim limit. These embodiments are discussed in more detail below.

In some embodiments, the adaptive G-factor compensation block 202 may generate the adaptive G-factor 203 based on the angular velocities 211 and steady state angular rate commands 213. The adaptive G-factor compensation block 202 may be configured to generate the adaptive G-factor 203 to increase the acceleration limit of the flight vehicle 100 during conditions of stability (e.g., when the flight-control system 200 is well-behaved) and within trim limits and to decrease the acceleration limit of the flight vehicle 100 when approaching an unstable condition (e.g., when approaching instability, which may be indicated when oscillations are detected or when nearing a trim limit). An increased acceleration limit may result in greater angles of attack 106 (FIG. 1A) while a decreased acceleration limit may result in lower angles of attack 106 (FIG. 1A).

The angular velocities 211 may be measured by gyros on board the flight vehicle 100 (FIG. 1A), and the steady state angular rate commands 213 may be provided by the guidance block 204. The angular velocities 211 may comprise a total angular velocity of the flight vehicle 100 and may include an angular velocity for the roll (p), pitch (q) and yaw (r) axes (i.e., for all three axes). The steady state angular rate commands 213 may include an angular rate command for at least a steady-state pitch ($q_{ss}$) and a steady-state yaw ($r_{ss}$). The canard-control signals 207, which may be used to command the canard positions, may be provided by the autopilot 206. The canard-control signals 207, for example, may include a delta aileron ($\delta_A$), a delta elevation ($\delta_E$) and a delta rudder ($\delta_R$) signal, which may be used to control the roll, pitch and yaw moments respectively.

The flight-control system 200 may be configured to multiply (with element 208) the adaptive G-factor 203 with the acceleration-limit from G-limit block 210 to generate the adaptively-controlled acceleration limit 209. The magnitude of an acceleration command 205 (i.e., G-command) from the guidance block 204 may be limited (with element 212) to the adaptively-controlled acceleration limit 209. Element 212 may provide a magnitude and angle of a limited acceleration command 215 to the autopilot 206 for use in generating, among other things, the canard-control signals 207.

In these embodiments, element 212 may be configured to select the minimum of the acceleration command 205 and the adaptively-controlled acceleration limit 209 to provide the limited acceleration command 215 to the autopilot 206. In these embodiments, the limited acceleration command 215 may comprise a vector with a magnitude that represents the acceleration limit and a direction that has components for at least pitch ($A_{zc}$) and yaw ($A_{yc}$). In these embodiments, the commanded roll angle or rate may be zero (i.e., no roll is desired). In some alternate embodiments in which roll is desired, the limited acceleration command 215 may include a component for roll.

In accordance with some embodiments, the acceleration limit of G-limit block 210 may be a predetermined acceleration limit that is selected from a plurality of predetermined acceleration limits (e.g., from a look-up-table) based on one or more of the G-angle 217 and the Mach and altitude of the flight vehicle 100. The selected acceleration limit of G-limit block 210 is a static limit that is unrelated to the current angular velocities 211 and steady state angular rate commands 213.

Although flight-control system 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application-specific integrated circuits (ASICs), radio-frequency integrated circuits (RFICs) and combinations of various hardware and logic circuitry for performing at least the functions described herein. In some embodiments, the functional elements of flight-control system 200 may refer to one or more processes operating on one or more processing elements. For example, the autopilot 206 and the guidance block 204 may utilize the same processor or set of processors.

Figure 2B:
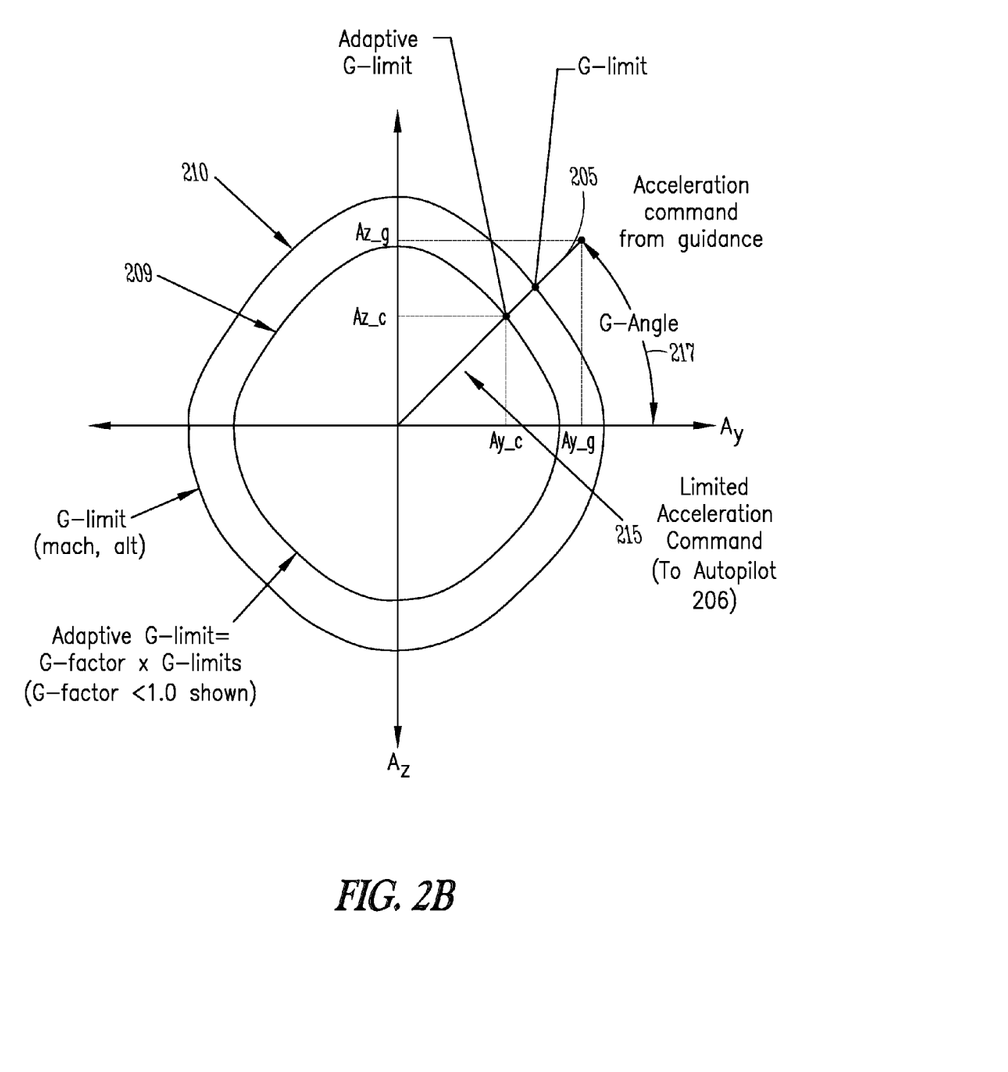
FIG. 2B graphically illustrates acceleration limits in accordance with some embodiments.

FIG. 2B graphically illustrates acceleration limits in accordance with some embodiments. As shown in FIG. 2B, the G-angle 217 may be viewed as the angle of the commanded pitch and yaw accelerations as plotted on a two-dimensional plot. The flight-control system 200 (FIG. 2A) may select the static acceleration limit provided by G-limit block 210 based on one or more of a G-angle 217, Mach and altitude of the flight vehicle 100. As discussed above, the flight-control system 200 may be configured to multiply the adaptive G-factor 203 (FIG. 2A) with the static acceleration-limit from G-limit block 210 to generate the adaptively-controlled acceleration limit 209. The magnitude of the acceleration command 205 (i.e., G-command) from the guidance block 204 (FIG. 2A) may be limited to the adaptively-controlled acceleration limit 209.

Figure 3:
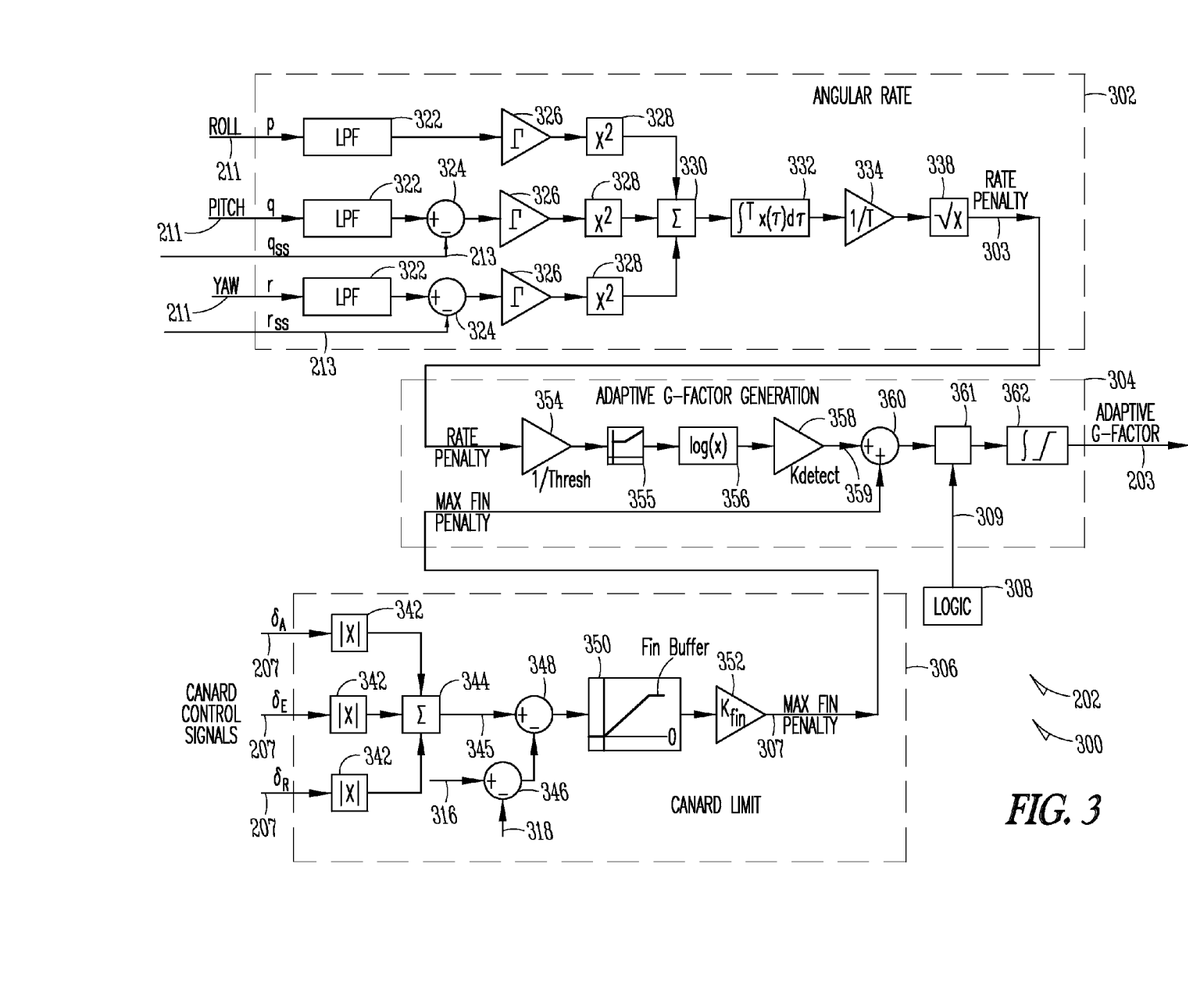
FIG. 3 is a functional block diagram of an adaptive G-factor compensation block in accordance with some embodiments.

FIG. 3 is a functional block diagram of an adaptive G-factor compensation block 300 in accordance with some embodiments. The adaptive G-factor compensation block 300 may be suitable for use as the adaptive G-factor compensation block 202 (FIG. 2A), although other configurations may also be suitable.

In these embodiments, the adaptive G-factor compensation block 300 may include an adaptive G-factor generation block 304 to generate the adaptive G-factor 203 from a rate penalty 303 and an angular-rate block 302 to generate the rate penalty 303. The rate penalty 303 may be based on differences between the angular velocities 211 and the steady state angular rate commands 213. The adaptive G-factor compensation block 300 may also include a canard limit block 306 to generate a maximum fin penalty 307 based on, among other things, the canard-control signals 207. The maximum fin penalty 307 may be used by the adaptive G-factor generation block 304 in generating the adaptive G-factor 203.

In these embodiments, the onset of instability may be detected by persistently high angular velocities 211 that may be indicated by the rate penalty 303. Using the rate penalty 303 and based at least in part on a threshold of element 354, the adaptive G-factor generation block 304 may either decrease or increase the adaptive G-factor 203 for subsequent multiplication with the static acceleration limit provided by G-limit block 210 (FIG. 2A). Accordingly, the static acceleration limit provided by G-limit block 210 may be expanded when the flight-control system 200 is well behaved. Furthermore, the static acceleration limit provided by G-limit block 210 may be penalized when the flight-control system 200 is behaving poorly.

In some embodiments, the rate penalty 303 generated by the angular-rate block 302 may represent differences between the total angular velocity of the flight vehicle 100 and the steady state angular rate command 213 in units of degrees per second. In some embodiments, a constant roll attitude may be desired (i.e., the roll angle should equal zero) and accordingly no angular-rate command for the roll axis is used by the angular-rate block 302. In these embodiments, the constant roll attitude may be useful to maintain sensors on the flight vehicle 100 (FIG. 1A) pointed in a certain direction. For example, maintaining a constant roll attitude may be useful to keep GPS antennas pointing upward. In other embodiments when a constant roll attitude is not desired, an angular rate command for the roll axis may be provided and utilized by the angular-rate block 302.

In accordance with some embodiments, the angular-rate block 302 may be configured to subtract the steady state angular rate commands 213 for at least the pitch and yaw axes from corresponding angular velocities 211, and compute a running average based on differences between the steady state angular rate commands 213 and the angular velocities 211. The running average may be used to generate the rate penalty 303. As illustrated in FIG. 3, the angular velocities 211 may be filtered with low-pass filters (LPFs) 322 to reduce the effect of sensor noise. Subtraction elements 324 may be used to subtract the steady state angular rate commands 213 from the corresponding angular velocities 211 after the low-pass filtering. The difference signals may be scaled by elements 326 and squared by elements 328 prior to being summed by element 330 and integrated by element 332. The scaling provided by elements 326 may adjust the sensitivity of the rate penalty 303 to each of the three axes, roll, pitch, and yaw. Element 334 may apply a threshold time (e.g., T=0.2 sec) for computing the running average, and element 338 may take the square root of the output to generate the rate penalty 303 from the running average.

In accordance with embodiments, the rate penalty 303 provided by the angular-rate block 302 may indicate persistent high angular rates, which may be indicative of instability. The max fin penalty 307 provided by the canard limit block 306 may indicate when the flight-control system 200 is approaching a trim limit. The trim limit may be the highest acceleration that the flight-control system 200 can control and may be limited by the position limits of the canards 102 (FIG. 1A) in a flight vehicle 100. (The trim limit may be the highest acceleration that the flight-control system 200 can control and may be limited by the position limits of tail fins in a tail controlled vehicle.) If the flight-control system 200 is not near the trim limit and is well behaved, then the adaptive G-factor 203 may be allowed to grow. If the flight-control system 200 is near the trim limit or the flight-control system 200 is behaving poorly, the adaptive G-factor 203 will be reduced.

In accordance with some embodiments, the canard limit block 306 may generate the maximum fin penalty 307 based on the canard-control signals 207 (e.g., canard command signals from the autopilot 206), a fin limit 316 (e.g., the maximum fin deflection) and a fin threshold 318 (e.g., a fin buffer amount). The adaptive G-factor generation block 304 may be configured to combine (e.g., add) the maximum fin penalty 307 with a form of the rate penalty 303 to generate the adaptive G-factor 203. Based on the maximum fin penalty 307, the adaptive G-factor generation block 304 may reduce the adaptive G-factor 203 when the canards 102 are being commanded to within the fin threshold (i.e., a predetermined amount such as within a few degrees of the fin limit 316). The canard limit block 306 may include element 352, and the gain (KO of element 352 may be negative to cause the maximum fin penalty 307 to reduce the adaptive G-factor 203.

In some example embodiments, when the canards 102 are being commanded by the canard-control signals 207 to within about the last few degrees or so of their limit (e.g., the fin limit 316), the acceleration limit of G-limit block 210 (FIG. 2A) may be reduced by the adaptive G-factor 203. In some embodiments, the fin limit 316 may be the maximum amount the canards 102 can turn. When the canards 102 are being commanded close to the fin limit 316, it may indicate that a trim limit may be approaching. Accordingly, the maximum fin penalty 307 may be increased to cause a possible reduction in the adaptively-controlled acceleration limit 209.

As further illustrated in FIG. 3, the canard limit block 306 may include element 342 to take the absolute value of the canard-control signals 207, and element 344 to sum the absolute values of the canard-control signals 207 to generate a sum 345. The canard limit block 306 may also include a subtraction element 346 to subtract the fin threshold 318 from the fin limit 316 to generate a difference output, and element 348 to subtract the difference output from the output of element 344. Element 350 may saturate the output of element 348 between zero and the fin buffer amount, and element 352 may scale the output of element 350 to generate the maximum fin penalty 307. The scale factor may be negative so that the maximum fin penalty 307 may reduce the adaptive G-factor 203.

In accordance with the embodiments illustrated in FIG. 3, the adaptive G-factor generation block 304 may include a thresholding element 354 to provide an output when the rate penalty 303 exceeds a threshold, a saturation block 355, a scaling element 356 to perform a scaling operation on the output of element 355 an element 358 to scale the output of scaling element 356, a summer 360 to combine the maximum fin penalty 307 with the output 359 of element 358. The output 359 of element 358 may be indicative of the rate-of-change of the adaptive G-factor 203. The output of the summer 360 may be provided to an integration block 362. The integration block 362 may perform integral G-factor control when generating the adaptive G-factor 203.

Scaling element 356 may perform non-linear scaling, such as log-function scaling, although this is not a requirement as scaling element 356 may alternatively be configured to perform linear scaling. The saturation block 355 may provide a predefined minimum output. For example, if the input to the saturation block 355 is less than a predefined value (e.g., 0.01), then the output value becomes 0.01. The use of the saturation block 355 may help ensure that scaling element 356, when implementing logarithmic scaling, does not take the logarithm of zero. Furthermore, the predefined value of the saturation block 355 may also define a maximum rate that the adaptive G-factor 203 may grow by.

In some example embodiments, the threshold used by the thresholding element 354 may be between two and five degrees per second. The scale factor used by scaling element 356 may be negative and may range from −0.1 to −0.01, although other values may also be used.

In some embodiments, the adaptive G-factor compensation block 300 may also include adaptive G-factor compensation logic 308 to inhibit the adaptive G-factor 203 from growing (i.e., increasing) during conditions of stability and when the vehicle trim limit is not being approached. In these embodiments, the adaptive G-factor compensation logic 308 may be used to inhibit the adaptive G-factor 203 from increasing acceleration limit of the flight vehicle 100 under certain conditions and only allow the acceleration limit to grow if the flight-control system 200 is actively riding the adaptive G-limits. The output 309 of the adaptive G-factor compensation logic 308 may be provided to an element 361 within the adaptive G-factor generation block 304 to inhibit the adaptive G-factor 203 from increasing under conditions described above. Embodiments of the adaptive G-factor compensation logic 308 are described in more detail below.

Although the adaptive G-factor compensation block 300 is illustrated as having several separate functional elements, one or more of the functional elements may be combined and may be implemented by combinations of firmware and software-configured elements, such as processing elements including digital signal processors (DSPs), and/or other hardware elements.

Figure 4:
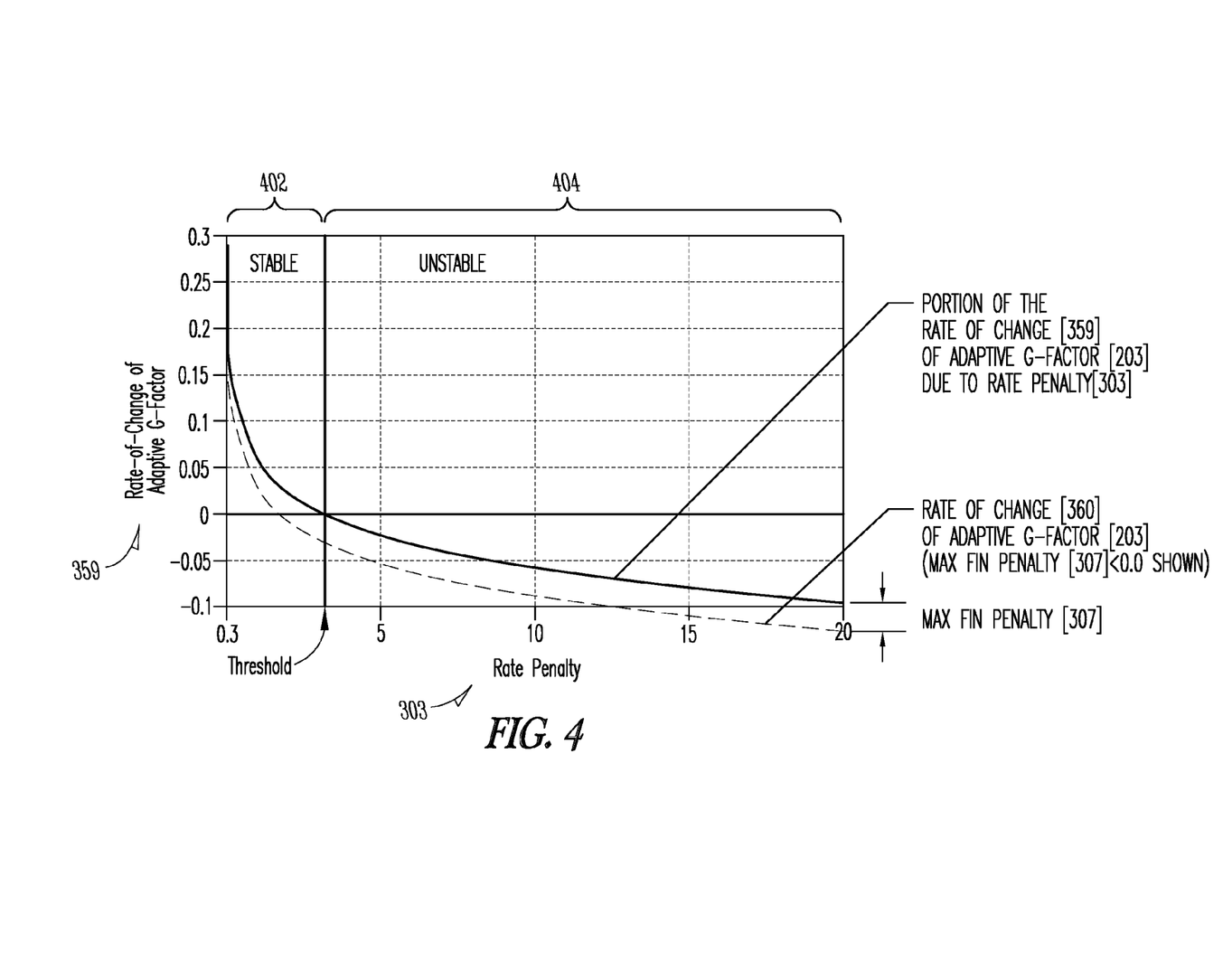
FIG. 4 graphically illustrates the adaptive G-factor as a function of a rate penalty and maximum fin penalty in accordance with some embodiments.

FIG. 4 graphically illustrates the adaptive G-factor as a function of a rate penalty and maximum fin penalty in accordance with some embodiments. The rate of change of the adaptive G-factor 203 (FIG. 2A) (y-axis) is shown as a function of the rate penalty 303 (x-axis). The rate of change of the adaptive G-factor 203 shown on the y-axis may correspond to output 359 (FIG. 3) of element 358 (FIG. 3). During conditions of stability 402 and when the flight vehicle 100 (FIG. 1A) is within trimmable limits, the rate-of-change of the adaptive G-factor 203 may be positive and may be used to increase the acceleration limit. During conditions of instability 404, the rate of change of the adaptive G-factor 203 may be negative and may be used to decrease acceleration limit of the flight vehicle 100. In some embodiments, the nominal value of the adaptive G-factor 203 may be 1.0, but may be limited above and below the nominal value by positive numbers (i.e., to a maximum of 1.5 and to a minimum of 0.5).

Figure 5:
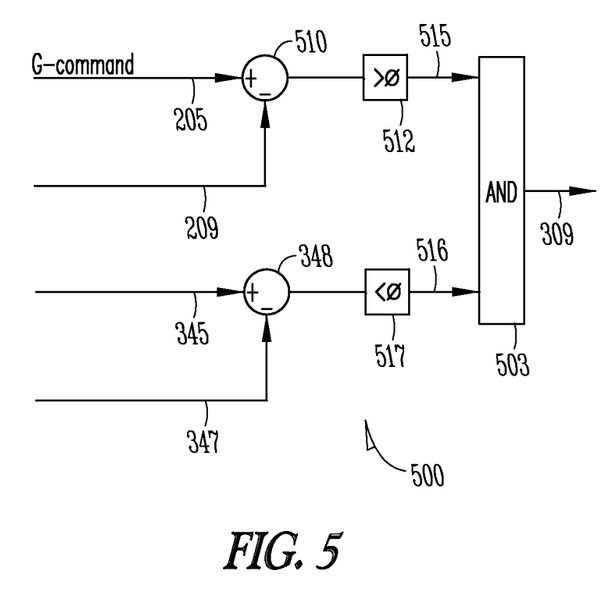
FIG. 5 illustrates adaptive G-factor compensation logic in accordance with some embodiments.

FIG. 5 illustrates adaptive G-factor compensation logic 500 in accordance with some embodiments. The adaptive G-factor compensation logic 500 may be suitable for use as adaptive G-factor compensation logic 308 (FIG. 3). In accordance with these embodiments, the adaptive G-factor compensation logic 500 may inhibit the adaptive G-factor 203 (FIG. 3) from growing during conditions of stability (i.e., when an onset of instability is not detected based on the monitoring of the angular velocities 211 (FIG. 3)) and when the vehicle trim limit is not being approached based at least in part on the canard-control signals 207 (FIG. 3). In these embodiments, the adaptive G-factor compensation logic 500 may be used to inhibit the adaptive G-factor 203 from increasing the G-limit 210 (FIG. 2A) under certain conditions and only allow the adaptively-controlled G-limit 209 to grow if the flight control system 200 (FIG. 2A) is actively riding the adaptive G-limits.

In these embodiments, the adaptive G-limit 209 will be allowed to grow if the acceleration command exceeds the current adaptive G-limit (i.e., guidance wants more than is available) and the adaptive G-limit 209 is not being reduced due to the proximity to a trim limit. As illustrated in FIG. 5, a logical "AND" operation may be performed by element 503 on outputs 515 and 516. Element 512 may use the sign of the output of summer 510 to determine if the G-command 205 is less than the adaptively-controlled G-limit 209. Element 517 may determine if the trim limit is being approached as determined by the sign of the output 347 of element 348 (see FIG. 3). The output 309 of element 503 is provided to element 361 (FIG. 3) to inhibit the adaptive G-factor 203 from increasing under conditions described above.

Figure 6:
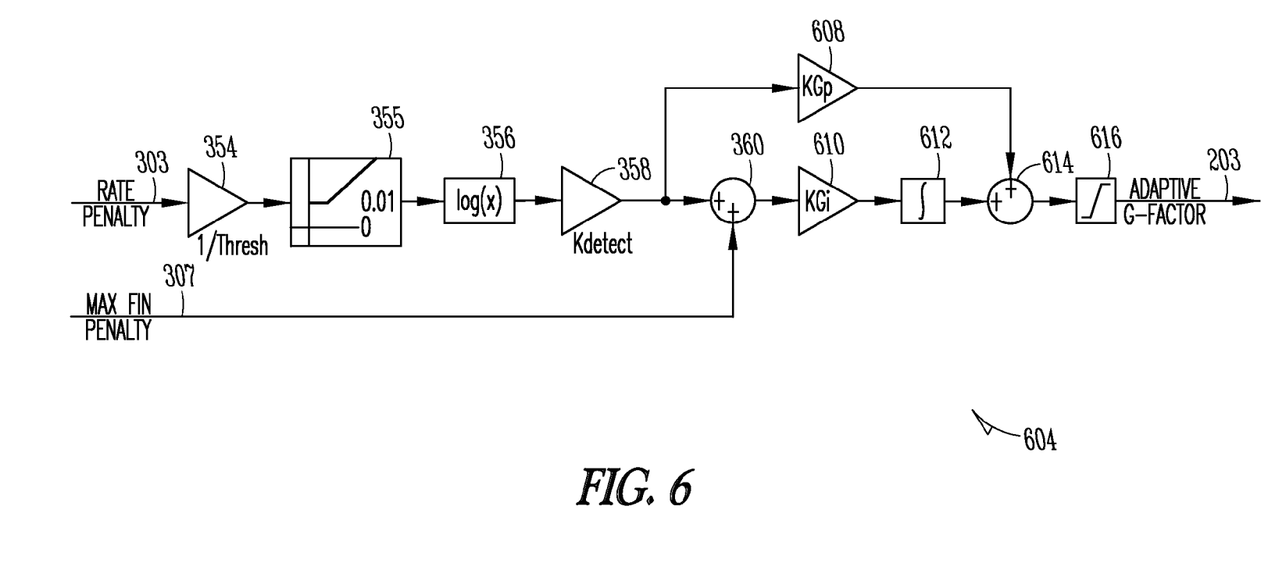
FIG. 6 is a functional block diagram of an adaptive G-factor generation block with burst control in accordance with some embodiments.

FIG. 6 is a functional block diagram of an adaptive G-factor generation block 604 with burst control in accordance with some embodiments. In these anti-bursting embodiments, the adaptive G-factor generation block 604 may be suitable for use as the adaptive G-factor generation block 304 (FIG. 3). Without the use of adaptive G-factor generation block 604, the adaptive G-factor 203 may experience bursts of instability due to entering and leaving of angles-of-attack 106 (FIG. 1A) where roll-control reversal occurs. The use of adaptive G-factor generation block 604 may help prevent this bursting of instability due to entering and leaving of angles-of-attack 106 where roll-control reversal occurs.

Adaptive G-factor generation block 604 may be configured to perform proportional-plus-integral (PI) control on the rate penalty 303 and integral control on the maximum fin penalty 307 to generate the adaptive G-factor 203. In these embodiments, the output of summer 360 is modified by gain element 610 prior to integration by element 612. The integration performed by element 612 is augmented by a gain element 608 from the rate penalty path whose outputs are combined by element 614. The adaptive G-factor generation block 604 may also be configured to saturate the adaptive G-factor 203 through the use of a saturation element 616. These anti-bursting embodiments may provide a smoother system response by better riding the edge of instability.

Some embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, flight-control system 200 may include one or more processors and may be configured with instructions stored on a computer-readable storage device.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A flight-control system for a canard-controlled flight vehicle, the flight control system comprising:
    an adaptive G-factor compensation block configured to:
    monitor angular velocities of the flight vehicle to detect an onset of instability; and adaptively control an acceleration limit of the flight vehicle based on the detected instability to reduce a probability of a roll-control reversal,
    wherein the acceleration limit is increased during conditions of flight vehicle stability and decreased during conditions of flight vehicle instability;
    an autopilot, coupled to the adaptive G-factor compensation block that generates flight vehicle control signals, to the canards, that move the canard positions in response to the adaptively controlled acceleration limit;
    the autopilot further:
    generates canard-control signals at least in part based on the adaptively-controlled acceleration limit that is generated by multiplying the adaptive G-factor with the acceleration limit; and
    monitors commanded canard positions based on the canard-control signals to determine when the flight vehicle is nearing a vehicle trim limit;
    wherein the adaptive G-factor compensation block reduces the acceleration limit when the flight vehicle is nearing the vehicle trim limit,
    wherein the adaptive G-factor compensation block further generates an adaptive G-factor based on the angular velocities and steady state angular rate commands and generates the adaptive G-factor to increase the acceleration limit during conditions of stability or when said vehicle operates within trim limits and
    to decrease the acceleration limit when approaching an unstable condition or when said vehicle approaches the vehicle trim limit,
    wherein a magnitude of an acceleration command is limited to the adaptively-controlled acceleration limit; and
    provide the magnitude and angle of the limited acceleration command to the autopilot for use in generating the canard-control signals.

2. The flight-control system of claim 1 wherein the onset of instability is detected by angular velocities, and
    wherein the acceleration limit is further adaptively controlled based on an approach of a vehicle trim limit determined at least in part from canard-control signals.

3. The flight-control system of claim 1 further configured to select the acceleration limit based on one or more of a G-angle, Mach number and altitude of the flight vehicle.

4. The flight-control system of claim 3 wherein the adaptive G-factor compensation block comprises an angular rate block that is configured to:
    subtract commanded angular rates for at least the pitch and yaw axes from corresponding inputs of angular velocities;
    compute a running average based on differences between the commanded angular rates and the inputs of angular velocities; and
    generate a rate penalty from the running average.

5. The flight-control system of claim 1 wherein the adaptive G-factor generation block includes an integration block coupled to a summer and configured to perform integral G-factor control when generating the adaptive G-factor.

6. The flight-control system of claim 5 wherein the adaptive G-factor generation block is further configured to perform proportional-plus-integral control to generate the adaptive G-factor in response to an output of the summer that is coupled to a gain element having an output coupled to an integration element wherein the output of the integration element comprises the adaptive G-factor.

7. The flight-control system of claim 1 wherein the flight vehicle is a gun-launched canard-controlled munition having controllable canards and fixed tail fins.

8. The flight-control system of claim 1 wherein the flight vehicle is a self-propelled guided missile having controllable canards and fixed tail fins.

9. The flight-control system of claim 1 further comprising adaptive G-factor compensation logic to inhibit the adaptive G-factor from growing during conditions of stability or when the vehicle trim limit is not being approached when a commanded acceleration from a guidance block does not exceed a current adaptive G-limit.

10. A method to reduce the probability of a roll-control reversal in a canard-controlled flight-vehicle, the method comprising:
    monitoring angular velocities of the flight vehicle to detect an onset of instability;
    adaptively controlling an acceleration limit of the flight vehicle based on the detected instability wherein the acceleration limit is increased during conditions of flight vehicle stability and decreased during conditions of flight vehicle instability;
    generating canard control signals that move the canards in response to the adaptively controlled acceleration limit that is generated by multiplying an adaptive G-factor with the acceleration limit;
    monitoring commanded canard positions based on the canard-control signals to determine when the flight vehicle is nearing a vehicle trim limit;
    an adaptive G-factor compensation block reducing the acceleration limit when the flight vehicle is nearing the vehicle trim limit,
    the adaptive G-factor compensation block generating an adaptive G-factor based on the angular velocities and steady state angular rate commands and generating the adaptive G-factor to increase the acceleration limit during conditions of stability or when said vehicle operates within trim limits and
    to decrease the acceleration limit when approaching an unstable condition or when said vehicle approaches trim limit, wherein a magnitude of an acceleration command is limited to the adaptively-controlled acceleration limit; and
    providing the magnitude and angle of the limited acceleration command to an autopilot for use in generating the canard-control signals.

11. The method of claim 10 wherein the onset of instability is detected by angular velocities, and
    wherein the acceleration limit is further adaptively controlled based on an approach of a vehicle trim limit determined at least in part from canard-control signals.

12. The method of claim 10 further comprising inhibiting the adaptive G-factor from growing during conditions of stability or when the vehicle trim limit is not being approached.

* * * * *

UNITED STATES PATENT AND TRADEMARK OFFICE
CERTIFICATE OF CORRECTION

PATENT NO. : 8,816,260 B2
APPLICATION NO. : 12/957557
DATED : August 26, 2014
INVENTOR(S) : Hindman et al.

It is certified that error appears in the above-identified patent and that said Letters Patent is hereby corrected as shown below:

In the Specification,

In column 6, line 10, delete "max" and insert --maximum--, therefor

In column 6, line 37, delete "(KO" and insert --($K_{fin}$)--, therefor

In column 6, line 55, delete "346" and insert --348--, therefor

In column 7, line 1, delete "output of element" and insert --saturation block--, therefor In column 8, line 15, delete "adaptive" and insert --adaptively-controlled--, therefor In column 8, line 16, delete "adaptive" and insert --adaptively-controlled--, therefor Signed and Sealed this
Twenty-fifth Day of November, 2014

Michelle K. Lee
*Deputy Director of the United States Patent and Trademark Office*